June 15, 1937.                    W. VOLKERS                    2,084,171
                    CONTROL OF ELECTROMAGNETIC TRACK BRAKES
                              Filed Nov. 10, 1934
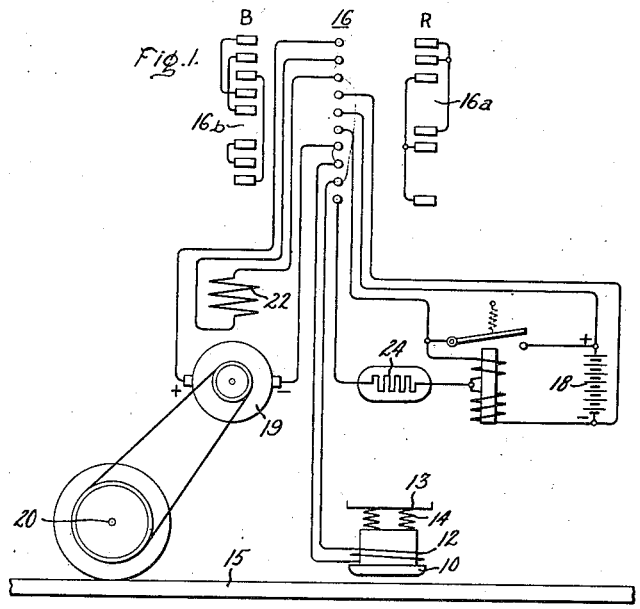
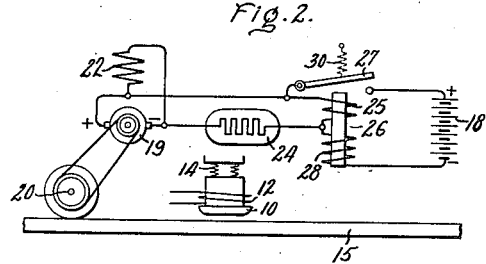 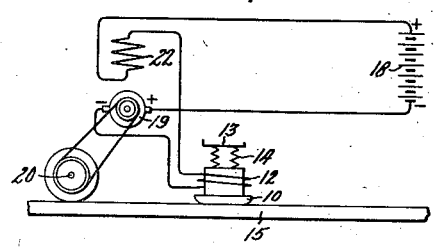
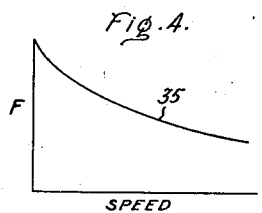 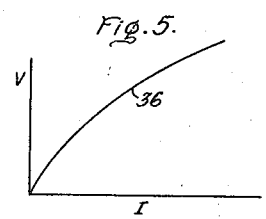 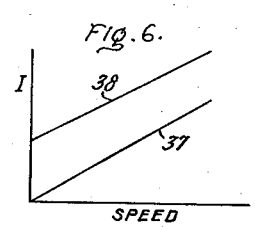
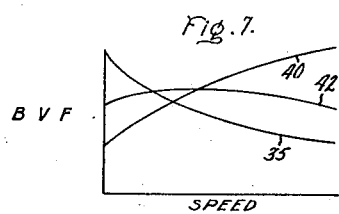
Inventor:
Walter Volkers,
by Harry E. Dunham
His Attorney.

Patented June 15, 1937

2,084,171

UNITED STATES PATENT OFFICE 2,084,171

CONTROL OF ELECTROMAGNETIC TRACK BRAKES

Walter Volkers, Berlin-Wilmersdorf, Germany, assignor to General Electric Company, a corporation of New York Application November 10, 1934, Serial No. 752,454
In Germany December 14, 1933

6 Claims. (Cl. 188—160)

My invention relates to the control of electromagnetic track brakes, and has for an object the provision of means for controlling the brakes so as to vary the coefficient of sliding friction in response to changes in the speed of the brake.

Heretofore railway cars have been provided with electro-magnetic track brakes controlled by means of the braking current, special generators, etc. Such systems have left much to be desired in producing a retardation force which is substantially constant irrespective of the traveling speed of the brake. The change in the retardation force is due to the change in the coefficient of the sliding friction with different speeds. For example, for a high speed, such as when a powerful braking effect is desirable, the coefficient of friction generally only amounts to a third or a quarter of its maximum value which is attained shortly before the stopping of the vehicle. Heretofore if it were desired to obtain great retardation at high speed, the electric dimensioning of the track brake magnet had to be increased to such a great extent that with low speeds an undesirably large braking force resulted.

In accordance with my invention, I provide means for maintaining the retardation force constant irrespective of speed and the corresponding changes in the coefficient of sliding friction. More specifically, I provide means responsive to the speed of the vehicle for varying the current and hence the braking force or effort of the track brake. In accordance with a further aspect of my invention, I provide a constant current source for the track brake which maintains a predetermined excitation of the electro-magnetic brake independently of the speed. By interconnecting the two sources of supply through suitable control means, I maintain the retardation force substantially constant independently of the traveling speed.

For a more complete understanding of my invention, reference should now be had to the drawing wherein I have shown diagrammatically in Fig. 1 a circuit arrangement embodying my invention; Figs. 2 and 3 are elementary diagrams showing the circuits completed by the controller of Fig. 1, while Figs. 4 to 7, inclusive, illustrate curves explanatory of the operation of my invention.

Referring to the drawing, I have shown my invention as applied to the control of an electromagnetic track brake 10 formed of steel or other suitable magnetizable material and provided with an operating winding 12. The brake is suspended from the frame 13 of the railway car (not shown) by suitable means of which there are many types well known to those skilled in the art. As shown, the springs 14 support the brake 10 for movement from out of engagement into engagement with the car rails at track 15. The brake winding 12 by means of a controller 16 can be connected in series circuit relation with a constant voltage source of supply indicated by the battery 18 and a generator 19 driven from the axle 20 of the railway car. The generator 19 is provided with a field winding 22 which by means of a controller 16 can be connected either in shunt circuit relation with its armature or in series circuit relation with the generator armature. With the controller in its right-hand or motoring position 16a, the circuit connections shown in Fig. 2 are completed for the charging of the battery 18. As shown, the field winding 22 is connected in shunt circuit relation with the generator armature. The output circuit of the generator includes an iron-hydrogen resistance 24 and a shunt coil 25 of a current relay 26. The connection of the generator 19 to the battery is determined by a movable switch member 27 operable between open and closed circuit positions by the shunt relay coil 25 and a current coil 28, these coils acting cumulatively during charging. As soon as the speed of the vehicle rises to a predetermined speed there occurs a corresponding increase in the voltage of the generator 19. As soon as this voltage exceeds the battery voltage 18, the current flowing through the coil 25 causes the relay 26 to operate its armature 27 to the closed circuit position to connect the battery 18 in circuit with the generator 19. The polarity is selected so that the battery is charged during the normal motoring operation of the railway car. In case the voltage of the generator 19 decreases to a value sufficient to permit the battery 18 to cause reverse current to flow through the coil 28, this coil acting in opposition to the coil 25 immediately causes the relay armature 27 to be operated by its biasing spring 30 to the open circuit position. The relay also opens in case the voltage drops below a predetermined value determined by the setting of the spring 30 and the attractive efforts exerted on the armature 27 by the coils.

When electric braking is desired, the controller 16 is operated to the left-hand or braking position 16b to complete the connections shown in Fig. 3, the generator, its field winding 22, the battery 18, and the brake operating coil 12 then being connected in series circuit relation. The brake 10 is operated by the coil 12, or other suitable mechanism, into braking engagement with the track 15.

With the car at a standstill, or shortly before the stopping of the car, the current flowing in the brake winding 12 corresponds to the substantially constant battery voltage. However, when the car is moving at a predetermined speed the generator voltage 19 added to the battery voltage causes a higher current to flow through the brake winding 12, the value of this current being proportional to the speed at which the car is moving. The relation between the voltage of the generator 19 and the battery 18 is selected so that the braking effort of the track brake 10 and the resulting retardation force are substantially constant irrespective of changes in the coefficient of sliding friction due to speed changes of the car.

These changes in the coefficient of sliding friction are shown by the curve 35 of Fig. 4 plotted with the speed of the car as abscissa and the coefficient of sliding friction F as ordinates. It will be seen that when the speed is zero, the car then being at a standstill, the coefficient of friction is a maximum. As the speed increases, the coefficient of sliding friction rapidly decreases until it is less than half that at standstill.

The magnetization curve 36 for the brake magnet shown in Fig. 5 has a shape complemental to the curve 35. Thus the magnetization curve 36, plotted with the magnetization current I as abscissa and voltage V as ordinates, is zero when the current is zero and rises as the current increases. The change in the braking current with speed is shown by curve 37 of Fig. 6, the speed being plotted as abscissa and the current as ordinates. The current produced by the series generator 19 of course rises in direct proportion to the increase in speed. The curve 38 of Fig. 6 illustrates the effect of the battery voltage, which effect of course is to increase by a predetermined fixed amount the current flowing in the generator winding 22 and the brake winding 12. The characteristic curves are combined in Fig. 7 with speed as abscissa. The curve 35 again represents the coefficient of friction. The curve 40 represents the voltage applied to the brake winding 12 and is obtained by taking into account the effect of the voltage of the battery 18. The retardation force or braking effort B illustrated by the curve 42 is obtained for any given speed by multiplying corresponding values of the coefficient of friction (curve 35) and the brake excitation (curve 40) together and multiplying the product by the mass of the vehicle. It will be observed that the retardation curve 42 is substantially flat. That is to say, the retardation is practically constant for all car speeds. It will, of course, be understood that an even more constant control of the retardation force can be effected by suitably changing the contributing factors of the system, or by introducing mechanical variations in the construction of the brake magnet 10.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States, is:

1. In combination with a railway car, an electromagnetic track brake provided with an operating winding, means mounting said brake for movement with said car, and means comprising a plurality of independent voltage sources connected in series accumulative relation with each other for supplying current to said winding the magnitude of which so varies with the speed of movement of said brake as to provide a substantially constant braking effort independent of said speed of movement.

2. In combination, an electromagnetic brake for a railway car, a winding for said brake, a constant voltage source of supply for said winding, a variable voltage source of supply responsive to the speed of said car and connected in series with said constant voltage source of supply and said winding, said sources of supply being so related to each other as to produce a substantially constant retardation effect by said brake independent of the speed of said railway car.

3. In combination, an electromagnetic track brake supported from a railway car, a winding for said brake, a constant voltage source of supply connected in series circuit relation with said winding, a series generator, means for driving said generator in accordance with the speed of said car, means connecting said generator in series accumulative circuit relation with said constant voltage source of supply, the current produced by said generator voltage and said constant voltage source of supply being additive and being so related as to produce by said track brake a braking effort which remains practically constant irrespective of the traveling speed of said car.

4. The combination with a railway car movable at different speeds upon a track, of an electromagnetic track brake, means suspending said brake from said car for operation into sliding engagement with said track, a brake winding for magnetically biasing said brake into engagement with said track, means for compensating for the changes in coefficient of sliding friction between said brake and said track due to changes in the sliding speed of said brake comprising a series generator connected in series circuit relation with said winding for producing a current through said winding proportional to the sliding speed of said brake, and a constant current source of supply connected in series circuit relation with said winding and with said series generator for modifying the effect of said generator so as to maintain substantially constant said braking effort irrespective of changes in the sliding speed of said brake.

5. The combination with a railway car and a track therefor, of an electromagnetic track brake formed of magnetizable material, means suspending said brake from said car for operation into sliding engagement with said track, the coefficient of the sliding friction between said brake and said track varying with the sliding speed of said brake, means controlling said brake to produce a substantially constant braking effort irrespective of said sliding speed and said resultant changes in the coefficient of said sliding friction comprising a constant source of supply connected in series circuit relation with said winding for supplying at all times to said circuit a substantially constant current, a second source of supply connected in series circuit relation with said winding and said constant source of supply for supplying a current to said winding proportional in magnitude to the sliding speed of said brake.

6. The combination with a railway car and a track therefor, of an electromagnetic track brake, means suspending said brake from said car for operation into sliding engagement with said track, a brake winding for magnetically biasing said brake into engagement with said track to produce a predetermined retardation force on said railway car, means for maintaining said retardation force substantially constant irrespective of changes in the coefficient of the sliding friction due to changes in the sliding speed of said brake comprising a series generator connected to said winding for producing a current proportional to the sliding speed of said brake, and a constant current source of supply connected in series with said winding and said generator for supplying at all times through said generator and said brake winding a predetermined current, the current from said source and from said generator combining in said winding to maintain said retardation force substantially constant.

WALTER VOLKERS.